United States Patent [19]
Smith

[11] Patent Number: 6,095,933
[45] Date of Patent: Aug. 1, 2000

[54] SIMPLIFIED GREEN SLOPE INDICATOR

[75] Inventor: Daniel E. Smith, Gahanna, Ohio

[73] Assignee: Gary P. Chassen, Reynolds Burg, Ohio; a part interest

[21] Appl. No.: 09/174,623

[22] Filed: Oct. 19, 1998

[51] Int. Cl.[7] .............................. A63B 57/00; G01C 9/24
[52] U.S. Cl. .............................................. 473/404; 33/379
[58] Field of Search .................................. 473/404, 406, 473/407, 285; 33/365, 377, 379

[56] References Cited

U.S. PATENT DOCUMENTS

| | | |
|---|---|---|
| 4,082,286 | 4/1978 | La Breche . |
| 5,326,096 | 7/1994 | H'Doubler .............................. 473/404 |
| 5,476,258 | 12/1995 | Frisone .................................. 473/404 |
| 5,582,554 | 12/1996 | Stryczek ................................ 473/404 |
| 5,669,832 | 9/1997 | Lehse .................................... 473/404 |
| 5,865,689 | 2/1999 | Heyman ................................ 473/404 |

*Primary Examiner*—Steven Wong
*Attorney, Agent, or Firm*—David A. Greenlee

[57] ABSTRACT

A slope indicator for indicating the slope of a golf green, comprises a polycarbonate flat circular base and a dome-shaped transparent cover that is filled with distilled water and has an observable bubble. The base has a spike extending from its lower surface and a circular flange extending from its upper surface that has a circular slot. The cover has a periphery which has a circular slot that receives the base flange to form a dome-shaped chamber having a predetermined volume. A direction indicator and radially-spaced slope markings are molded into the cover. The slope indicator is assembled by inverting the cover and metering a predetermined quantity of distilled water into it that is less than the volume to create the bubble. The base is then assembled to it with glue. In use, the slope indicator is placed on a golf green with the spike engaging the golf green. If there is any slope, the bubble will displace from the top of the dome. The slope indicator is rotated to align the direction indicia with the bubble to indicate the direction of slope of the golf green. The degree of slope of the golf green is indicated by the displacement of the bubble from the top center of the cover as measured by the position of the bubble relative to the slope indicator.

9 Claims, 3 Drawing Sheets

SIMPLIFIED GREEN SLOPE INDICATOR

TECHNICAL FIELD

This invention relates to devices which indicate the slope of a golf green and, more particularly, to such a device which is miniaturized and incorporated into a ball marker.

BACKGROUND OF THE INVENTION

Golfers are presented with the same challenge on every golf hole. This challenge is to putt the golf ball into the hole in as few strokes as possible. To do this requires that the ball be stroked to successfully traverse an expanse of grassy terrain that is not flat or level. Determining just how to compensate for the terrain irregularities of a golf green requires an accurate assessment of the magnitude of these irregularities, particularly the slope of the green. This enables the golfer to measure the slope of a golf green to aid in determining the proper "line" that the putt must take.

Devices have been developed to aid golfers by indicating the deviation of the green slope from level. One such device is presented in U.S. Pat. No. 4,082,286, in which a spirit level and slope measurement chart are incorporated into the head of a putter. This device is of limited utility since it is linear and will only display the slope of the green transverse to the line of the putt, indicating only a break to the left or right. It will not display the absolute slope of the green, which is useful in determining whether the putt is uphill or downhill. Another is shown in U.S. Pat. No. 5,669,832 in which a tripod incorporates a spirit level that is placed over a ball. Another is shown in U.S. Pat. No. 5,476,258 which discloses a ball marker having a so-called "bulls-eye level" comprising a flat chamber filled with oil of specific viscosity and a steel ball; slope is determined by the speed at which the steel ball traverses the oil in the chamber.

All of these prior art devices are either bulky, unduly complex, expensive or provide only incomplete information. Thus there is a need for golf green slope indicator which is simple in construction, inexpensive and provides information on the absolute slope of the green.

SUMMARY OF THE INVENTION

Accordingly, it is an object of this invention to provide a golf green slope indicator which is simple in construction, inexpensive and provides information on the absolute slope of the green.

In one aspect, this invention comprises a slope indicator for indicating the slope of a golf green, comprising a circular base having an upper surface and a lower surface. A spike extends from the lower surface, and a circular flange extends from the upper surface. A dome-shaped transparent cover has a peripheral flange which is received by the peripheral circular flange to form a dome-shaped chamber having a predetermined volume. A predetermined quantity of liquid, less than the dome volume is confined within the chamber, creating a bubble of sufficient size to be observable by a golfer when the slope indicator is placed on a golf green with the spike engaging the golf green. The slope of the golf green is indicated by the displacement of the bubble from the top center of the cover.

In another aspect, this invention features a directional marker which, when the bubble is aligned, indicates the direction of the absolute slope. Also, the cover carries slope indicia which indicate the severity of the slope.

Preferably, the liquid is distilled water which will remain clear during the life of the slope indicator and will not create permanent stain if it accidentally breaks and leaks the liquid.

These and other objects and features of this invention will become more readily apparent upon reference to the following detailed description of this invention depicted in the accompanying drawings, in which:

DESCRIPTION OF THE PREFERRED EMBODIMENT

Figure 3:
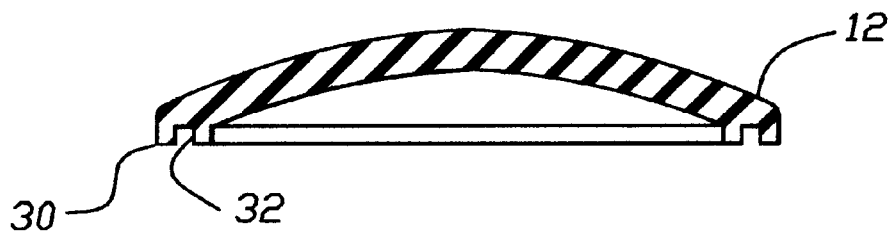
FIG. 3 is a transverse sectional view of the cover of the slope indicator.
Figure 4:
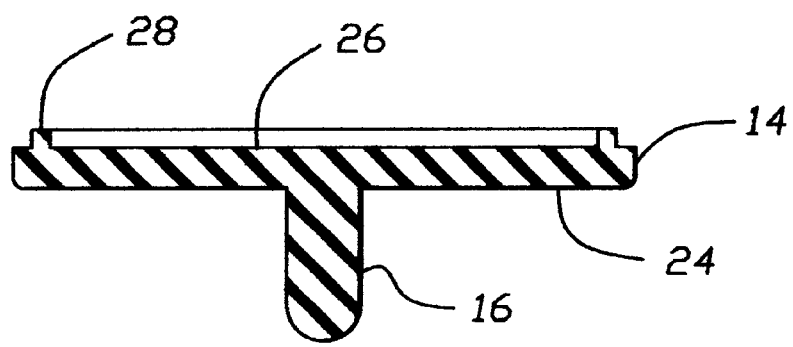
FIG. 4 is a transverse sectional view of the base of the slope indicator.
Figure 5:
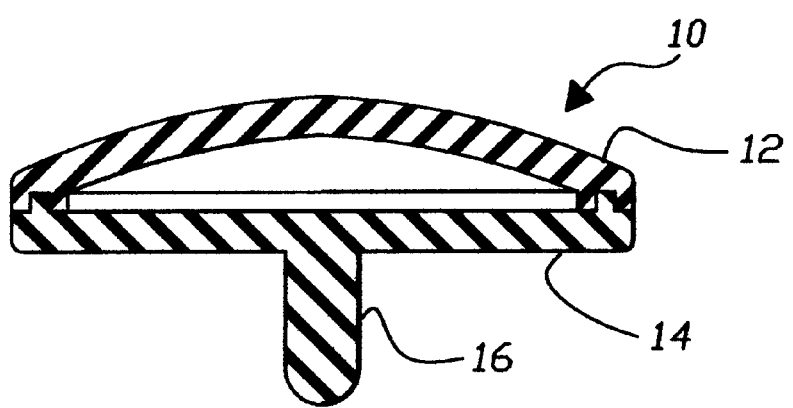
FIG. 5 is a transverse sectional view of the slope indicator.

Referring to FIGS. 1–5 of the drawings, a simplified green slope indicator 10 comprises a transparent dome-shaped cover 10 and a flat base 14 having a depending spike 16. Cover 12 and base 14 are made of plastic, preferably a polycarbonate, which, when assembled as illustrated in FIG. 3, create a dome-shaped chamber 18 having a predetermined volume. Chamber 18 is substantially filled with a predetermined quantity of liquid 20 that is sufficiently less than the predetermined volume to create a bubble 22 which is large enough to be readily observable.

Base 14 has a flat bottom surface 24 and a flat upper surface 26. A circular flange 28 which is slightly inset from the outer periphery extends upwardly from upper surface 26. Cover 12 has a depending peripheral flange 30 that includes a circular groove 32 that receives base flange 28 when assembled, as illustrated best in FIG. 5.

Figure 1:
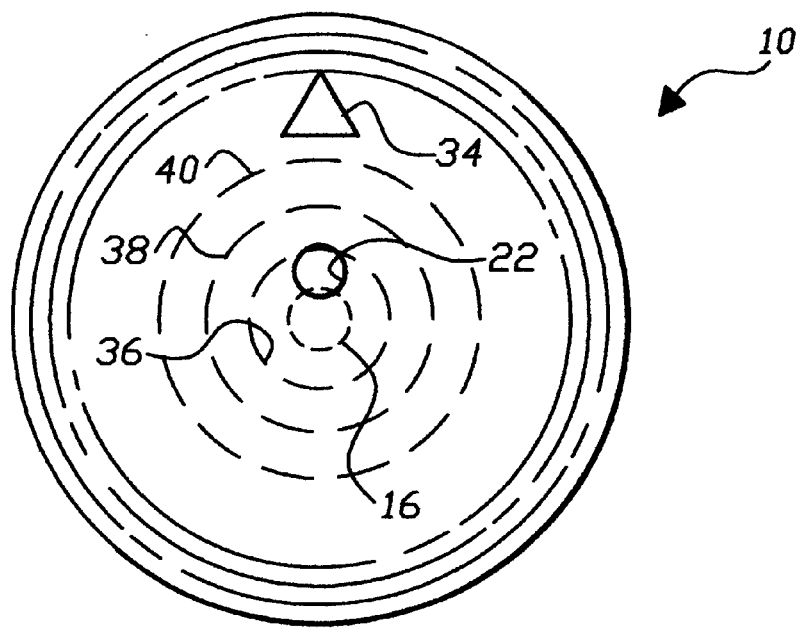
FIG. 1 is a plan view of a slope indicator according to this invention.
Figure 2:
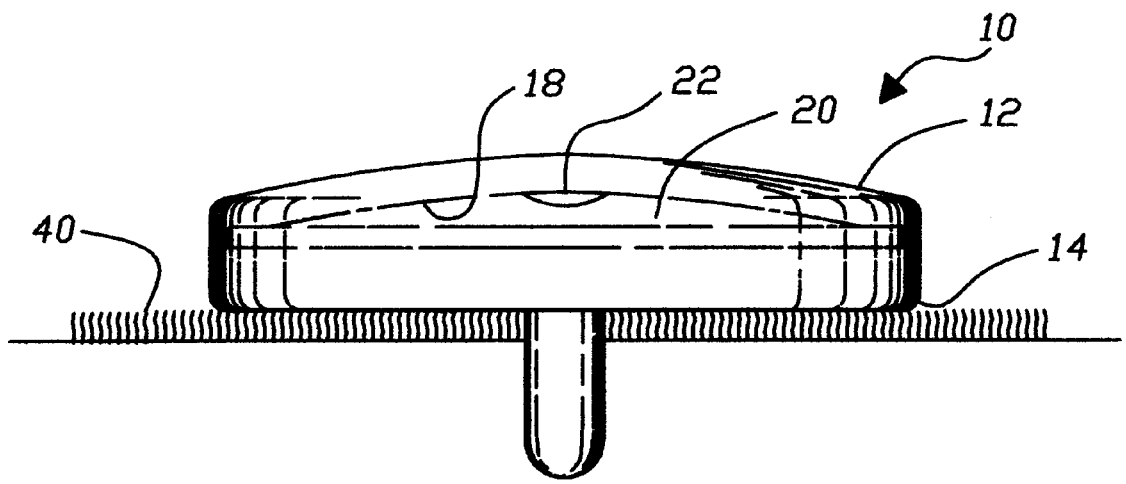
FIG. 2 is a front view of the slope indicator of FIG. 1.

Dome 12 has a triangular directional indicator 34 on one side, and three radially-spaced rings of circumferentially-spaced marks 36, 38 and 40 to indicate the severity of slope. In use, slope indicator 10 is placed on a golf green 40 (FIG. 2) with spike 16 penetrating the surface. If there is any slope, bubble 22 will displace from the top of dome 12. Slope indicator 10 is then rotated about spike 16 to align direction indicator 34 with bubble 22, as shown in FIG. 1, to indicate the absolute direction of slope of the golf green. The degree of slope of the golf green 40 is indicated by the displacement of bubble 22 from the top center of cover 12 as measured by the position of bubble 22 relative to the slope indicator marks 36, 38 and 40.

As a golfer becomes experienced with continued use of slope indicator 10, he will learn how to interpret the placement of bubble 22 relative to the slope indicator marks 34, 36 and 38. Because cover 12 is dome-shaped, the direction of absolute slope of the green can be determined, which will aid the golfer in determining the line his putt must take.

Slope indicator 10 is assembled as follows. Cover 12 is inverted and the predetermined quantity of liquid, preferably distilled water, is metered into chamber 18. A quantity of glue (not shown) is inserted into groove 32. Base 14 is then filled over cover 12, with flange 28 inserted into groove 32 where it is secured by the glue, creating a watertight chamber 18.

Figure 6:
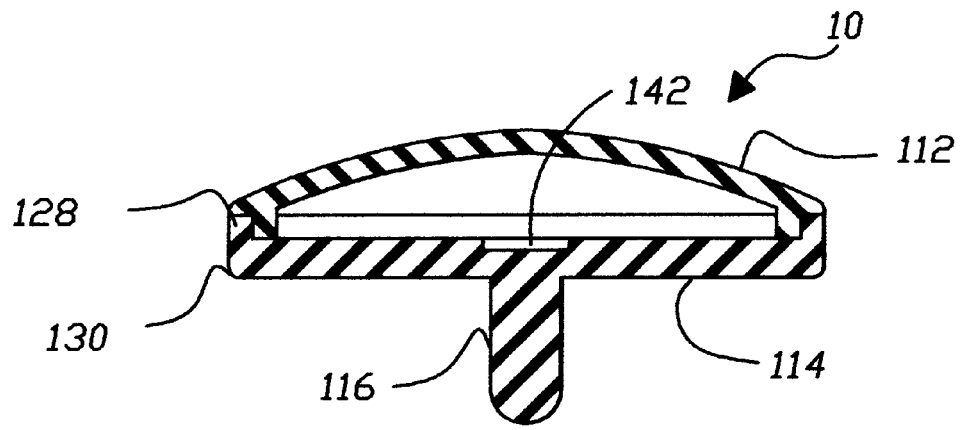
FIG. 6 is a transverse sectional view of an alternative form of slope indicator.
Figure 7:
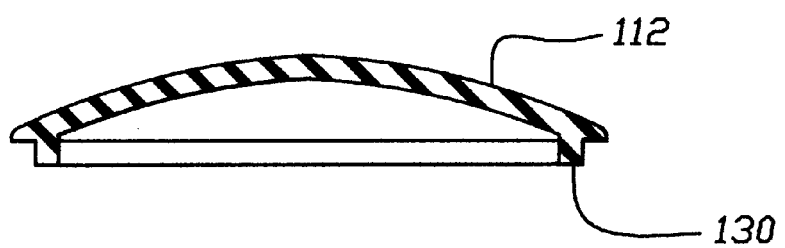
FIG. 7 is a transverse sectional view of the cover of the slope indicator of FIG. 6.
Figure 8:
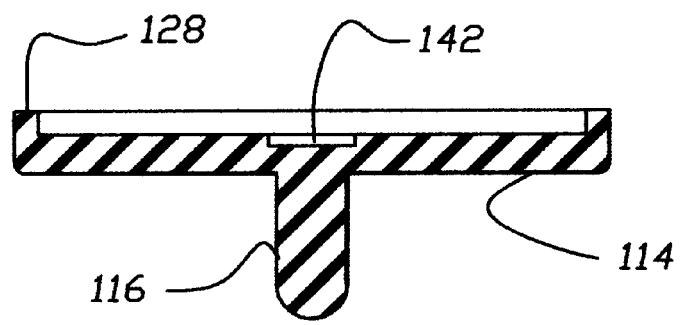
FIG. 8 is a transverse sectional view of the base of the slope indicator of FIG. 6.

An alternative construction of slope indicator 110 is illustrated in FIGS. 6–8. A dome 112 has an inset depending circular flange 130 which fits inside a mating circular flange 128 of a base 114 that has a spike 116. Base 114 includes a central depression 142 of a volume equal to the bubble in the finished slope indicator. In assembly, dome 112 is inverted and overfilled with water. When base 114 is fitted onto dome 112 and inverted, depression 142 will fill with water and create the bubble in dome 114.

While only a preferred embodiment and alternative construction have been described and shown, obvious modifications will become readily apparent that are within the scope of this invention and the following claims.

I claim:

1. A slope indicator for indicating the slope of a golf green, comprising a circular base having an upper surface and a lower surface, a spike extending from the lower surface, a circular flange extending from the upper surface, a dome-shaped transparent cover having a peripheral flange which is received by the peripheral circular flange to form a dome-shaped chamber having a predetermined volume, and a predetermined quantity of liquid confined within the chamber, said quantity being sufficiently less than said volume to create a bubble of sufficient size to be observable by a golfer when the slope indicator is placed on a golf green with the spike engaging the golf green, whereby the degree of slope of the golf green is indicated by the displacement of the bubble from the top center of the cover.

2. The slope indicator of claim 1, including direction indicia, wherein the base lower surface is flat to enable the slope indicator to be rotated when placed on the golf green to align the direction indicia with the bubble to indicate the direction of slope of the golf green.

3. The slope indicator of claim 1, wherein the base circular flange is radially inset from the outer edge of the base.

4. The slope indicator of claim 2, including slope indicia carried by the cover to indicate the severity of the slope by the location of the bubble relative thereto.

5. The slope indicator of claim 4, wherein the slope indicator is small enough to be easily carried in the pants pocket of a golfer.

6. The slope indicator of claim 5, wherein the liquid is distilled water.

7. The slope indicator of claim 6, wherein the liquid is colored to make the bubble more readily observable by the golfer.

8. The slope indicator of claim 3, wherein the base and cover are made of polycarbonate material, the cover peripheral flange has a circular groove formed therein, and the base flange is received within said groove to secure the cover to the base.

9. A slope indicator for indicating the slope of a golf green, comprising a circular plastic base having an upper surface and a lower surface, a spike extending from the lower surface, a circular flange extending from the upper surface, a dome-shaped transparent plastic cover having a peripheral flange which has a circular groove that receives the base flange to form a dome-shaped chamber having a predetermined volume, a predetermined quantity of water confined within the chamber, said quantity being sufficiently smaller than said volume to create a bubble of sufficient size to be observable by a golfer when the slope indicator is placed on a golf green with the spike engaging the golf green, direction indicia, and radially-space slope indicia carried by the cover, wherein the base lower surface is flat to enable the slope indicator to be rotated when placed on the golf green to align the direction indicia with the bubble to indicate the direction of slope of the golf green whereby the degree of slope of the golf green is indicated by the location of the bubble relative to the slope indicia.

* * * * *